W. P. ANTHONY.
GRASS TRIMMING IMPLEMENT.
APPLICATION FILED MAR. 12, 1919.

1,307,471.

Patented June 24, 1919.

WITNESS:

INVENTOR
Wendell P. Anthony
BY
ATTORNEY.

UNITED STATES PATENT OFFICE.

WENDELL P. ANTHONY, OF RIDLEY PARK, PENNSYLVANIA.

GRASS-TRIMMING IMPLEMENT.

1,307,471.　　　　　　Specification of Letters Patent.　　Patented June 24, 1919.

Application filed March 12, 1919. Serial No. 282,206.

*To all whom it may concern:*

Be it known that I, WENDELL P. ANTHONY, a citizen of the United States, residing at Ridley Park, county of Delaware, and State of Pennsylvania, have invented a new and useful Improvement in Grass-Trimming Implements, of which the following is a full, clear, and exact description, reference being had to the accompanying drawings, which form a part of this specification.

My invention relates to grass cutting machines and has for its object the production of a light, inexpensive tool to supplement a lawn mower, for the purpose of trimming close to a fence, hedge or tree and which will be useful also in cutting wire grass or sprouts that have attained a height which would merely be pressed down and not cut by the usual mower.

My invention comprises superimposed serrated cutting blades slidable one upon the other to cut grass between the serrations, the blades being portably carried in a horizontal position, and means for operating them while the implement is being moved about, as will hereinafter be set forth.

The usefulness of my invention will be readily appreciated by the average householder, as it will save much barking of trees and shrubs. The construction is of light pressed metal, with the usual lawn mower form of handle by which it may be operated both to be moved about and to do the cutting.

I will now proceed to a detailed description of a preferred embodiment of my invention in connection with the accompanying drawings, in which—

Figure 1:
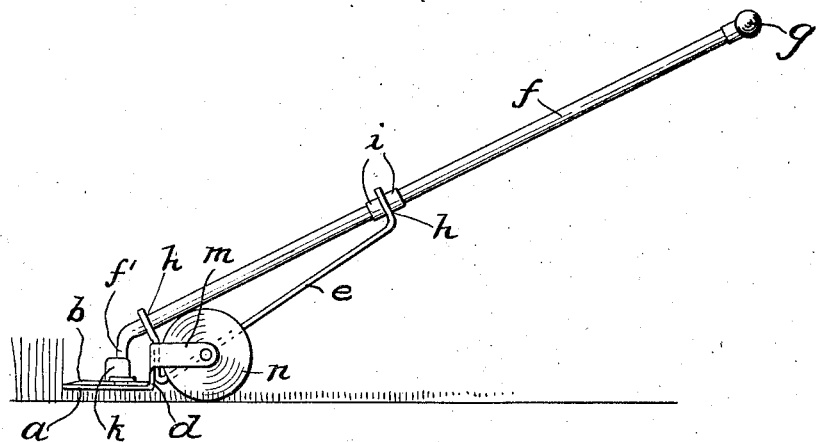
Figure 1 is a side elevation showing the implement in action.
Figure 2:
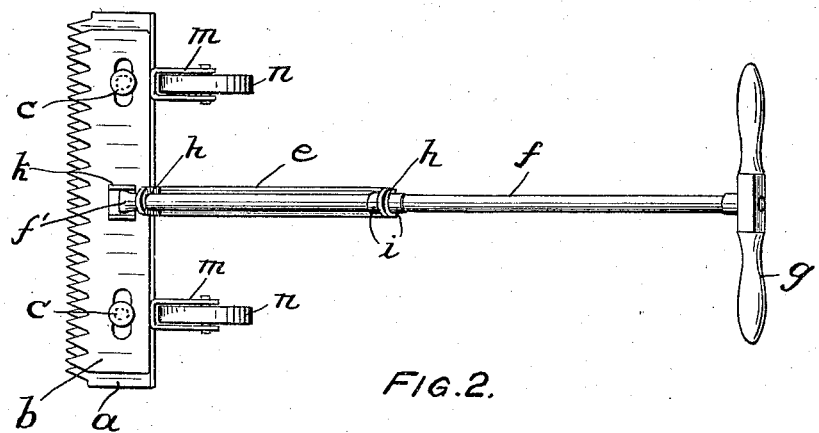
Fig. 2 is a plan view.
Figure 3:
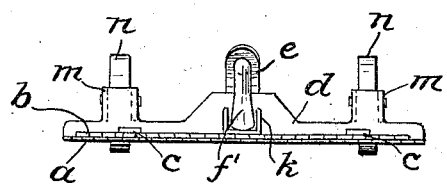
Fig. 3 is a front view of the cutting head.

The blades $a$ and $b$ have forwardly extending serrated edges, and lie flat one upon the other so that a relative lengthwise sliding movement will produce a cutting action between the serrations of the lower and upper plate. The lower plate $a$ is relatively stationary and plate $b$ slides thereon, guided by the slot and pin connections $c$. Plate $a$ is bent up at the rear of plate $b$, forming flange $d$, to the middle of which is secured a rearwardly extending bracket $e$. A shaft or pushing rod $f$, provided with a handle $g$, is turnably mounted in the bracket, by extending through orifices at $h$ and having collars $i$ to prevent longitudinal movement.

The pushing rod is positioned at an angle to plates $a$ and $b$, so that when the handle $g$ is grasped and pushed at the usual height, the plates are horizontal.

The forward end of rod $f$ is bent downward, forming an arm $f'$ depending between two flanges formed by a U-shaped piece $k$ attached to the middle of plate $b$. Thus, by turning rod $f$, first one way and then the other, plate $b$ is caused to slide upon plate $a$ and produce the cutting action desired.

Flange $d$ is provided with ears $m$, on either side, which are bent rearwardly and form bearings for wheels $n$, of a size to normally support the cutting blades a short distance above the ground when in running condition.

The operator grasps handle $g$ with both hands, and as he pushes the implement forward gives the handle a seesaw movement, causing the plates to perform their cutting action at the same time they are being fed forward into the grass or other growth being trimmed.

Having now fully described my invention, what I claim and desire to protect by Letters Patent is:

1. A grass trimming implement comprising a pair of serrated cutting blades, a push rod connected with said blades and by means of which the blades may be pushed forward, said push rod being rockable on its longitudinal axis, and means operable by the push rod, in its rocking movement, to impart to one blade a transverse reciprocating movement relatively to the other.

2. A grass trimming implement comprising a pair of coacting clipping blades, a frame connected with one of said blades, wheels for supporting the frame, a push rod turnably mounted on its longitudinal axis in the frame and means whereby the turning of the push rod operates to reciprocate the other clipping blade.

3. A grass trimming implement comprising a pair of coacting clipping blades horizontally disposed, supporting wheels on one of said blades, a shaft turnably carried by the same blade and serving as a rod, and means for reciprocating the other clipping blade by rocking said shaft.

4. A grass trimming implement consisting of a serrated cutting blade, means for supporting said blade close to the ground, a second serrated blade for coacting with the first blade, a pushing rod carried by the first blade in bearings whereby said handle may be rocked like a shaft on its axis, and an arm on said handle engaging flanges on the second blade whereby rocking the handle will reciprocate said blade.

5. A grass trimming implement comprising a pair of serrated cutting blades, said blades having a relative transverse reciprocating movement, a single pushing rod with cross-bar handle, and two connections operable by said pushing rod, one of which bodily advances the implement when the cross bar is pushed and the other of which reciprocates when an oscillatory movement is imparted to the cross-bar.

6. A grass trimming implement comprising a pair of coacting serrated clipping blades, ears carried by one of the blades, supporting wheels mounted in the ears, a bracket carried by the same blade, a handle turnably carried in an angular position in bearings on said bracket, a vertical arm on one end of said handle, flanges on the other of said blades embracing said vertical arm, and slot and pin connections between said blades whereby they may be slid one upon the other when the handle is turned in its bearings.

7. A grass cutting implement comprising a frame, a horizontally disposed serrated cutting blade fixed to said frame, a second cutting blade transversely slidable in the first named blade, bearings on the frame, a shaft turnable in said bearings, an arm on one end of said shaft engaging the second cutting blade and a cross arm at the other end of the shaft forming a handle for pushing and rocking the shaft whereby when the handle is turned in one direction the second cutting blade is slid to one side and when the handle is turned in the other direction the blade is slid to the other side.

In testimony of which invention I have hereunto set my hand at Eddystone, Pa., on this 8th day of March, 1919.

WENDELL P. ANTHONY.

Copies of this patent may be obtained for five cents each, by addressing the "Commissioner of Patents, Washington, D. C."